United States Patent [19]

Taylor et al.

[11] 4,361,883
[45] Nov. 30, 1982

[54] CARTRIDGE FORCE AND BIAS ADJUSTMENT GAGE

[75] Inventors: Byron K. Taylor, Carmel; Gerald D. Pyles, Danville, both of Ind.

[73] Assignee: RCA Corporation, New York, N.Y.

[21] Appl. No.: 144,293

[22] Filed: Apr. 28, 1980

[51] Int. Cl.$^3$ ..................... H04N 5/76; G11B 3/00; G11B 17/00

[52] U.S. Cl. ................................. 369/55; 33/180 R

[58] Field of Search ................. 369/55; 33/180 R; 324/71 R

[56] References Cited

U.S. PATENT DOCUMENTS 2,478,223  8/1949  Argabrite .
4,176,378 11/1979  Toda et al. .

OTHER PUBLICATIONS

R. D. Douglas, *Semiconductor and Conventional Strain Gages*, Academic Press, N.Y., 1962 pp. 329–333 & 339.

Gulton Industries Bulletin H200a, Piezoelectric Ceramic Transducers, 1964.

*Primary Examiner*—Steven L. Stephan
*Attorney, Agent, or Firm*—E. M. Whitacre; J. S. Tripoli; E. P. Herrmann

[57] ABSTRACT

An apparatus for aiding in the final orientation of a video disc stylus assembly within the stylus cartridge. A fixture is arranged for receiving and securing cartridge assemblies in precise spatial relation to successive assemblies. A cantilever secured in fixed spatial relation to the cartridge has its free distal end arranged to engage the stylus assembly, which engagement produces deflections in the cantilever relative to the position of the stylus assembly with respect to the cartridge. Electromechanical transducers, coupled to the cantilever, measure and indicate minute deflections therein. The stylus position is then altered manually or by controlled mechanical means in accordance with the measured deflection in the cantilevers.

10 Claims, 5 Drawing Figures

CARTRIDGE FORCE AND BIAS ADJUSTMENT GAGE

This invention relates to apparatus useful for adjusting the relative position of a video disc signal pickup stylus within the cartridge assembly to which the stylus is secured.

Video disc playback systems comprise apparatus for recovering prerecorded information from disc records. The density of information on such discs is extremely high. To achieve the high information density the information is recorded in spiral or concentric tracks having a density which may be as high as 10,000 tracks per inch.

Where the tracks are formed as a spiral groove, a concomitant result is that the groove depth is often very shallow. The shallow groove cannot be dependably relied upon to pull the weight of a signal pickup stylus assembly across the entire recorded surface of the disc record. Therefore the stylus assembly is compliantly mounted in a carriage mechanism which translates the stylus assembly radially across the disc in proper time relationship with the recovered signal. The stylus assembly is sometimes contained in a cartridge, which cartridge is removable from the carriage mechanism for replacement purposes.

Integral to the carriage mechanism in some systems are several sensor and transducer elements which cooperate with the stylus arm. The sensor elements may be part of a servo system for controlling the rate at which the carriage mechanism translates radially across the disc. Since the stylus assembly is compliantly mounted to the carriage mechanism, the stylus may move radially across the disc relative to the carriage. The relative stylus-carriage movement is detected and used to control the carriage speed. The transducer elements, on the other hand, are magnetically coupled to the stylus arm to impart limited impulsive motion to the stylus for the production of special effects such as stop motion for example. Due to the extremely close spacing of the information tracks on the disc record and due to the signal pickup stylus cartridges being interchangeable, it can readily be appreciated that reliable performance of the player mechanism depends upon proper alignment of each stylus assembly within its respective cartridge. The present invention is directed toward adjusting the position of the stylus relative to the cartridge with a high degree of accuracy and repeatability.

In accordance with the present invention an apparatus is arranged for receiving and securing cartridge assemblies in precise spatial relation to successive assemblies. A cantilever secured in fixed spatial relation to the cartridge has its free distal end arranged to engage the stylus assembly, which engagement produces deflections in the cantilever relative to the position of the stylus assembly with respect to the cartridge. Electromechanical transducers, coupled to the cantilever, measure and indicate minute deflections therein. The stylus position is then altered manually or by controlled mechanical means in accordance with the measured deflection in the cantilevers.

Figure 1:
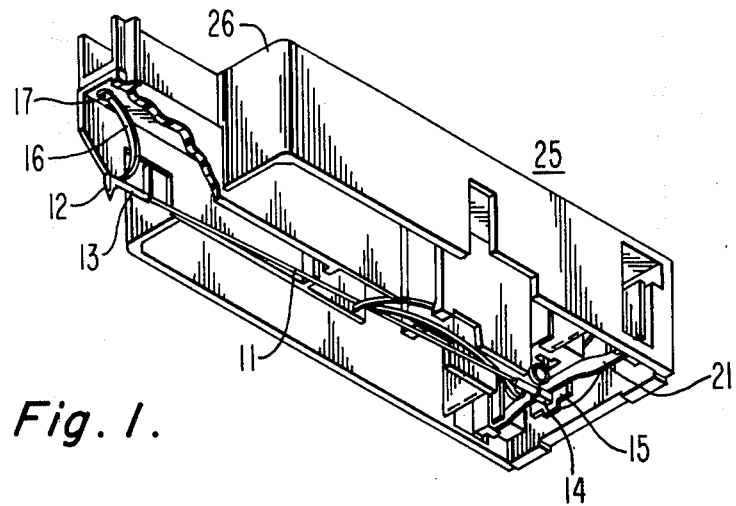
FIG. 1 is a perspective drawing of one type of video disc signal pickup cartridge.
Figure 2:
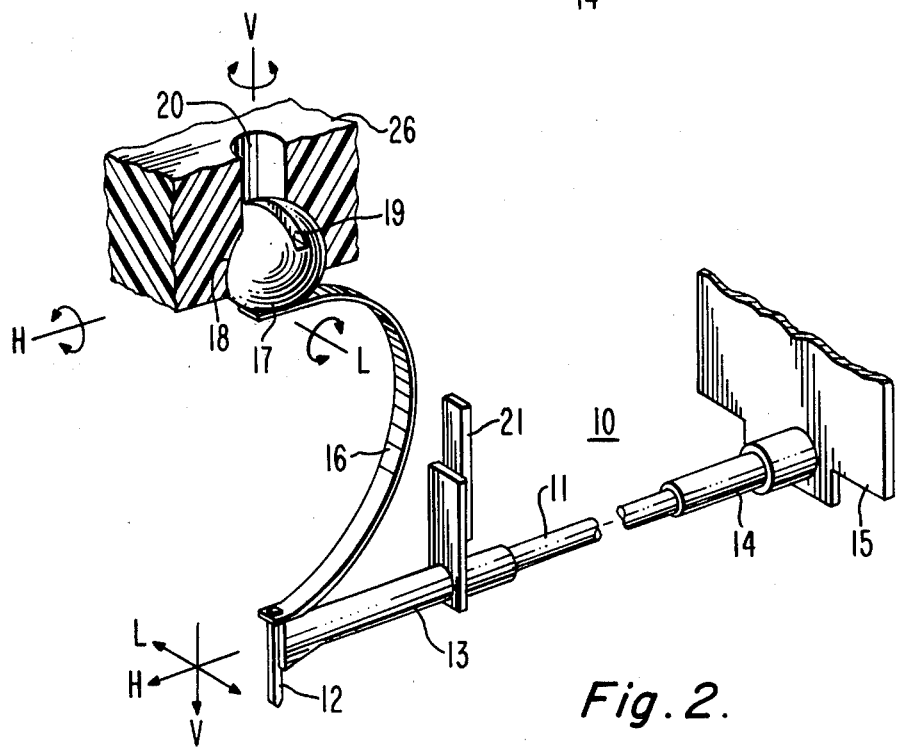
FIG. 2 is a perspective drawing of the signal pickup stylus-stylus arm assembly mounted within the FIG. 1 cartridge.

Referring to FIGS. 1 and 2 the cartridge 25 includes an enclosure 26 for supporting and protecting the relatively fragile signal pickup stylus arm assembly 10. The enclosure 26 is a rigid non-deformable material. Mounted therein is a signal pickup stylus 12 secured to a stylus holder 13 which in turn is attached to a first end of the stylus arm 11. The other end of the stylus arm is attached to a plate 15 by a compliant coupler 14 which allows the stylus arm to have relatively free pivotal movement about the connection to plate 15 at least over a limited range of motion. The plate 15 is secured to enclosure 26 by the elastic diaphragm 21 which permits limited longitudinal motion of the stylus arm.

A leaf spring 16 (usually conductive) has a first end attached to the stylus 12 or stylus holder 13 and a second end secured to the cartridge enclosure 26 by an adjusting member 17 rotatably secured in the enclosure. Adjusting member 17 may be spherically shaped and constrained within a generally close fitting spherical cavity 18 within a portion of the enclosure material 26. The fit between the member 17 and cavity 18 is sufficiently tight that motion of the flylead will not cause rotation therebetween but sufficiently loose to permit desired rotation of the member by introduction of a tool into the cavity 19 and either rotating the tool about the generally vertical axis "V" and/or rocking the tool within the cavity 20 provided in the enclosure 26. Alternatively member 17 may be cylindrically shaped in a cylindrical cavity 18 with adjustment accomplished by rotating the cylinder about the lateral axis, "L", and/or sliding the cylinder within the cavity 18 along the lateral axis.

The leaf spring 16 serves to apply a predetermined pressure between the stylus and the disc record during record playback, and provides electrical connection between the signal pickup stylus and video processing circuitry (not shown) and may be used as one electrode of a position sensitive capacitor for determining the relative position of the stylus with respect to the sidewalls of the cartridge or the carriage. For the latter application, one electrode of an air dielectric variable capacitance is fixed to the carriage, the other capacitor elecrode is fixed to the stylus arm. As the arm moves laterally (the direction designated "L" in the drawing) the change in capacitance is detected to indicate the relative change in stylus carriage position.

The item 21 attached to the stylus holder is a magnet which cooperates with electromagnets secured to the carriage to selectively impart lateral motion to the stylus end of the stylus arm.

The flylead 16 is sufficiently compliant to permit the stylus to have relatively free lateral motion and to enable it to track an eccentric groove. Though compliant, the flylead is suffciently stiff to position the stylus in space laterally, when no lateral forces are applied to the stylus. This lateral positioning is accomplished by orienting the member 17, e.g., to effect a limited rightward lateral stylus position change, the member 17 is rotated clockwise about the vertical axis. Similarly the stylus disc pressure may be altered by effecting a change in the flylead arc deformation by rotating member 17 about the lateral axis.

Figure 3:
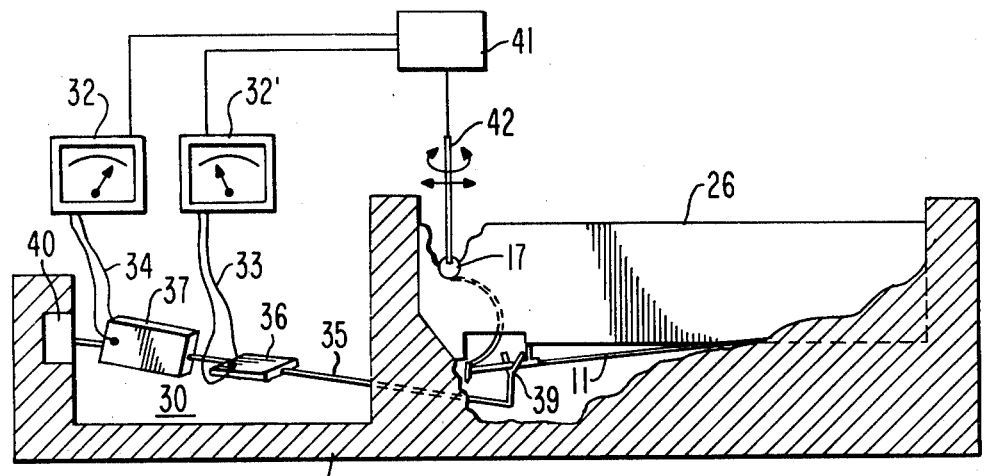
FIG. 3 is a schematic diagram of an apparatus embodying the present invention for measuring and adjusting the spatial position of the stylus arm with respect to the cartridge.

In order to position the stylus rapidly and with precision it is desirable to have apparatus to accurately measure and indicate the stylus position while adjustments are being performed. FIG. 3 illustrates such apparatus wherein a fixture 38 is configured to retain a stylus-cartridge assembly 26 in a fixed spatial relation to a stylus position measuring device 30. The measuring device 30 comprises a composite cantilever secured to the fixture 38. The particular cantilever illustrated includes first and second (37 and 36) transducers and the beam portion 35. The fixed end of the cantilever is coupled to the fixture 38 by means of apparatus 40 for positioning the free end of the cantilever and thereby calibrating the system. The free end of the cantilever beam 35 is equipped with a generally "V" shaped element 39 for engaging the stylus arm when the cartridge is inserted in the fixture. The "V" shape enables the cantilever to capture the stylus arm over a relatively wide region while the downward force exerted by the flylead forces the stylus arm to slide into the vertex of the "V" and therefore in a known relation with the cantilever. If the stylus arm aligns precisely with the vertex of the "V" upon insertion of the cartridge into the fixture 38, then no lateral forces (i.e., into or out of the page) are exerted on the cantilever. A lateral misalignment of the stylus arm-vertex does produce lateral forces therebetween which effect a lateral bending or deflection of the cantilever. The lateral deflection of the cantilever is imparted to the transducer 37 in amplified form by virtue of the ratio of the length of the respective lever arms comprising respectively the total cantilever and the length of the transducer 37 plus its coupling means to the fixture 38. The beam section 35 is stiff to constrain substantially all of the lateral cantilever bending to the transducer 37. Transducer 37 in conjunction with the display means produces a signal proportional to the amount of deflection of the free end of the cantilever and thereby the offset of the stylus arm with respect to the desired position of the stylus arm. It then becomes an easy matter to reposition the stylus arm by adjusting the flylead (i.e., member 17) until the cantilever deflection indication is reduced to zero or to whatever bias is desired. The deflection signal from transducer 37 and means 32 may be applied to a controller and motive means 41, coupled mechanically to member 17 by the shaft 42 to perform the adjustment automatically.

In a similar manner the vertical pressure imparted by the flylead may be adjusted since the stylus arm applies a vertical force to the cantilever and thereby a vertical deflection or bending thereto. The vertical bending is translated to the transducer 36 arranged in 90 degree relation to transducer 37 and indicated by the means 32'.

A variety of transducers are adaptable to the present application. For example, the transducers 36 and 37 may be multilayer piezoelectric crystals arranged to produce a potential between opposite faces when the crystals are subjected to a bending moment. Alternatively the transducers may be composite semiconductor-metal structures (strain gages) which exhibit an electrical resistance change upon bending. In the former case the deflection may be read directly on a voltmeter such as a digital voltmeter, in the latter the resistance change would typically be reduced to a voltage indication via a bridge circuit, e.g., the strain gage would be one element in a Wheatstone bridge.

Figure 4:
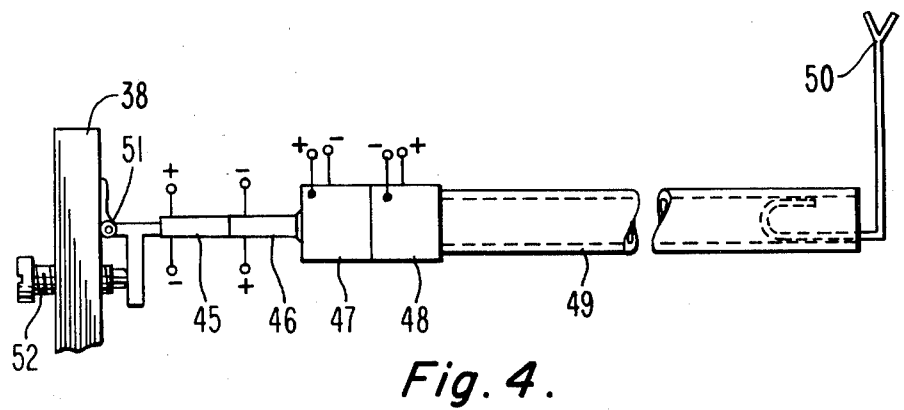
FIG. 4 is a composite cantilever having two sets of transducers, each transducer of a set arranged to produce a signal complementary to the other.

FIG. 4 illustrates a particular cantilever transducer arrangement which incorporates matched sets of transducer elements arranged to compensate for their parametric changes, such as thermal drifts. The composite cantilever comprises four transducers, two (45, 46) arranged in complementary fashion for indicating vertical deflection, and two (47, 48) arranged in complementary fashion for indicating lateral deflection of the rigid beam section 49 of the cantilever.

Each of the transducers is approximately 0.33 inches in length forming a combined length of 1.25 inches. The beam section 49 is a hollow aluminum tube having a wall thickness of 0.004 inches, a diameter of 0.040 inches, and a length of 4 inches. The total cantilever length is therefore approximately 5.25 inches. The cradle or "V" shaped element in this configuration is a preformed section of 0.012 inch piano wire which is doubled back on itself and inserted into the tube 49. The inherent spring force of the doubled over section serves to retain the element 50 within the tubular beam.

An alternative to using a "V" shaped wire mounted at the end of the cantilever to engage the stylus arm is to mount a small portion of a grooved disc record to the cantilever. The composite cantilever would then be located so that the disc portion engages the stylus directly yielding a device with inherently greater sensitivity. Use of the disc record material for engaging the stylus lessens the likelihood of damaging the relatively fragile stylus.

The composite cantilever is secured to the fixture by the hinged mount 51. Adjusting screw 52 engages the mount 51 to establish the nominal vertical location of the free end of the structure.

The electrical connections are shown having a particular polarity, for illustration only, to indicate that the parametric changes in the transducers occur in opposite directions in the adjacent elements. For example, if transducers 45 and 46 exhibit a resistive change upon bending, the resistance of transducer 45 increases and that of 46 decreases for a downward bending of the free end of the cantilever and vice versa. If the resistance of the transducers 45 and 46 are sensitive to ambient conditions, e.g., temperature changes, then, however, the nominal resistance of both transducers 45 and 46 will change in the same direction, for example, the resistance of 45 and 46 may similarly decrease.

Figure 5:
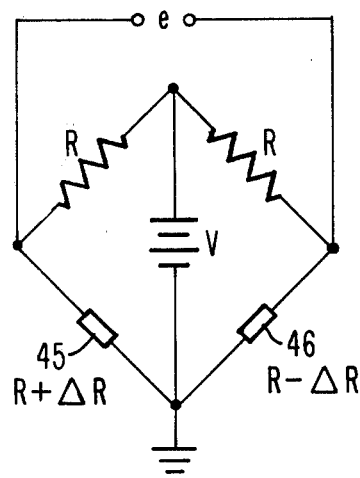
FIG. 5 is a bridge circuit arrangement for transforming the parametric changes of a transducer set into useful signals.

A bridge circuit such as illustrated in FIG. 5 is particularly appropriate for reducing transducer parametric changes into an output signal "e". In this arrangement the transducers 45 and 46 are placed in opposite sides of the bridge. Since parametric changes in the transducers due to ambient conditions are similar in both transducers, such changes do not tend to imbalance the bridge and therefore generate no output signal. The parametric changes due to the bending of the transducers, however, increase the nominal resistance of 45 and decrease the nominal resistance of 46 tending to unbalance the bridge in additive fashion resulting in an enhanced output signal which is relatively insensitive to changes in ambient conditions.

The illustrated embodiments of the invention are intended as examples only. One skilled in the art of electro-mechanical transducers and armed with the foregoing may readily generate variations of these embodiments without straying from the spirit of the invention and the claims should be construed in this light.

What is claimed is:

1. An apparatus for determining the positional relationship of a stylus arm assembly with respect to a cartridge in which the assembly is mounted, said apparatus comprising:
   a fixture means for receiving and holding the cartridge in a predetermined fixed position;
   a cantilever member having a first end arranged to receive the stylus arm when the cartridge is placed in said fixture, a second end of said cantilever member being secured to said fixture so that the longitudinal axes of the stylus arm and the cantilever member are generally parallel;
   transducer means coupled to the cantilever member to measure the deflection of the cantilevered member created by the stylus arm; and
   means connected to the transducer means to exhibit the deflection.

2. The apparatus set forth in claim 1 wherein the transducer means comprises first and second electromechanical transducers secured to the cantilever member in 90 degree relation with respect to each other for measuring the deflection of the cantilever member in two dimensions and thereby the stylus arm alignment within the cartridge.

3. The apparatus set forth in claim 1 wherein the means connected to the transducer means comprises an analog voltmeter.

4. The apparatus set forth in claim 1 wherein the means connected to the transducer means comprises a meter for displaying alphanumeric characters.

5. The apparatus set forth in claims 1 or 2 including further means, responsive to the measured deflection and coupled to a stylus arm adjustment mechanism within the cartridge, for adjusting the stylus arm within predetermined limits.

6. The apparatus as set forth in claims 1 or 2 wherein the transducer means comprises a piezoelectric transducer arranged as an integral part of the cantilever member for producing a signal potential proportional to a bending between the ends of the cantilever member.

7. The apparatus set forth in claims 1 or 2 wherein the transducer means comprise strain gages secured to the surface of the cantilever member proximate its second end.

8. Apparatus for use in setting the position of the stylus arm assembly within a video disc stylus cartridge, said cartridge including a signal pickup stylus attached to a first end of the stylus arm, the second end thereof being compliantly coupled to the cartridge, and having a leaf spring flylead attached at a first end thereof to the first end of the stylus arm, the second end of the flylead being attached to the cartridge by a rotatable member for adjusting the direction at which the second end of the flylead engages the cartridge and thereby influencing the relative position of the stylus arm, said apparatus comprising:
   a rigid fixture for securing the cartridge in a fixed relation therewith;
   a cantilever having its longitudinal axis arranged generally parallel with the longitudinal axis of the stylus arm and secured at a first end thereof to said rigid fixture, the second end of the cantilever having a generally "V" shaped configuration arranged to engage the stylus arm proximate the signal pickup stylus when a cartridge is secured to the fixture;
   transducer means cooperating with the cantilever to measure deflection of said cantilever to thereby indicate the position of the stylus arm relative to a nominal standard.

9. The apparatus set forth in claim 8 wherein the transducer means comprises first and second electromechanical transducers arranged in a 90 degree relationship therebetween, said transducers being colinear with and integral to the cantilever, and located nearer the first end of the cantilever for indicating deflections therein due to forces between the cantilever and the stylus arm concurrently in two directions substantially normal to each other.

10. The apparatus set forth in claim 8 further including means responsive to the measured deflection and mechanically coupled to the rotatable member for repositioning the second end of the flylead and thereby the first end of the stylus arm.

* * * * *